United States Patent
MacDonald et al.

(10) Patent No.: US 9,487,744 B2
(45) Date of Patent: Nov. 8, 2016

(54) FERMENTATION OF FRUIT JUICES

(71) Applicant: Rymco International AG, Zurich (CH)

(72) Inventors: Alan Cameron MacDonald, Cape Town (ZA); Patrice Pellerin, Laverune (FR); Celine Sparrow, Vinines (FR)

(73) Assignee: RYMCO INTERNATIONAL AG, Zug (CH)

( * ) Notice: Subject to any disclaimer, the term of this patent is extended or adjusted under 35 U.S.C. 154(b) by 0 days.

(21) Appl. No.: 14/128,937

(22) PCT Filed: Oct. 5, 2012

(86) PCT No.: PCT/IB2012/055370
§ 371 (c)(1),
(2) Date: Dec. 23, 2013

(87) PCT Pub. No.: WO2013/050972
PCT Pub. Date: Apr. 11, 2013

(65) Prior Publication Data
US 2014/0205716 A1    Jul. 24, 2014

(30) Foreign Application Priority Data

Oct. 7, 2011 (ZA) ................................. 2011/07379
Feb. 24, 2012 (ZA) ................................. 2012/01375

(51) Int. Cl.
C12G 1/00 (2006.01)
C12G 1/02 (2006.01)

(52) U.S. Cl.
CPC ................ C12G 1/005 (2013.01); C12G 1/02 (2013.01)

(58) Field of Classification Search
CPC ................................. C12G 1/005; C12G 1/02
USPC ........................................ 426/15, 62; 99/276
See application file for complete search history.

(56) References Cited

U.S. PATENT DOCUMENTS

| | | | | |
|---|---|---|---|---|
| 4,217,420 A | * | 8/1980 | Langejan | C12N 1/04 426/18 |
| 4,790,238 A | * | 12/1988 | Hsu | C12C 11/006 426/15 |
| 4,797,365 A | * | 1/1989 | Pomper et al. | 435/255.1 |
| 5,266,337 A | * | 11/1993 | Barwald et al. | 426/15 |
| 7,744,938 B2 | * | 6/2010 | Smet | C12N 1/16 426/106 |
| 2013/0323379 A1 | * | 12/2013 | Bernal et al. | 426/330.6 |

FOREIGN PATENT DOCUMENTS

| | | |
|---|---|---|
| DE | 25 15 360 | 10/1976 |
| DE | 20 2011 001869 | 1/2012 |
| EP | 1 167 514 | 1/2002 |
| EP | 1 325 952 | 7/2003 |
| GB | 1 492 992 | 11/1977 |
| GB | 2483662 | 3/2012 |

OTHER PUBLICATIONS

Ferrarini, Roberto et al., "Mechanical dispersion procedures improve the rehydration of active dry yeast," Enzyme and Microbial Technology, 40:1251-1255 (2007).
Koch, Jürgen, European Patent Office, "International Search Report," mailed on Mar. 5, 2013 (3 pages).

* cited by examiner

Primary Examiner — Michele L Jacobson
Assistant Examiner — Bhaskar Mukhopadhyay
(74) Attorney, Agent, or Firm — Tarter Krinsky & Drogin LLP

(57) ABSTRACT

A method of introducing yeast into a fruit juice such as grape must to be fermented is disclosed. The method comprises feeding dry yeast into a flowing stream of the fruit juice and delivering the flowing stream of fruit juice with the yeast in it to a mixer (10). The fruit juice and yeast emerging from the mixer is fed into a fermentation tank. The yeast can include nutrients selected from inactivated yeasts, yeast autolysates, yeast cell hulls, yeast extracts, amino acids, peptides, proteins, sterols, ergosterol, thiamin, biotin, pantothenic acid, niacin, riboflavin, pyridoxine, minerals and inorganic nitrogen in the form of ammonium salts.

11 Claims, 2 Drawing Sheets

FERMENTATION OF FRUIT JUICES

FIELD OF THE INVENTION

THIS INVENTION relates to the fermentation of fruit juices to produce alcoholic beverages.

BACKGROUND TO THE INVENTION

Modern fermentation processes used for the production of wine, cider, beer, sake, potable ethanol and other fermentation products include the use of selected yeasts. Selected yeasts are made commercially available to the producer in dry forms, either as vermicellae (Instant Dry Yeast IDY) or pellets (Active Dry Yeast ADY). These dry forms are standard in the yeast industry as they allow long term storage while keeping a very high viability in the range 1 to $3 \times 10^{10}$ colony forming units per gram of dry products. Commercial dry yeasts include more than 500 different strains. Most of them belong to *Saccharomyces* genus and a few to other geni such as *Torulaspora, Metschnikowia, Pichia* or *Candida*.

The use of a selected yeast strain is an essential quality step in modern winemaking and other fermentation industries. For winemaking, grapes are crushed or pressed to release a grape must. As harvested grapes are not pasteurised and sterilized, they contain a vast population of indigenous (or wild) yeasts of different genii. Yeast cells of the selected commercial strain compete with this indigenous flora. It is therefore essential for the winemaker to ensure a "successful implantation" of the selected yeast strain. This means that the commercial yeast must be added with adequate viability so that it becomes predominant among naturally occurring yeasts in the fermentation media. It is accepted in the fermentation industry, and especially in the winemaking industry, that such yeasts must be added after a careful rehydration step. The objective of rehydration is to achieve the maximum viability (expressed as the percentage of live cells) immediately prior to introduction of the rehydrated yeast into the grape must. Rehydration is dealt with extensively in the article entitled "Rehydration Protocols for Active Dry Wine Yeasts and the Search for Early Indicators of Yeast Activity" published in Am. J. Enol. Vitic. 57:4 (2006). Applicant is not aware of any disclosure of any procedure which does not include the rehydration step with all its inherent difficulties that are known to winemakers worldwide.

Standard rehydration includes the following steps:
Preparation of a water solution at 37 to 40° C. in a rehydration receptacle (a bucket or a small tank). Sugar or grape must is added to reach 40 g/l of sugar;
Addition of ADY or IDY to this warm solution with continuous stirring;
mixing (gentle to vigorous);
the solution stands for 20 min to achieve rehydration. Formation of foam due to the production of CO2 is visible at this stage;
preferably the solution is diluted progressively using grape must from the tank to be fermented. This is to avoid a temperature shock if there is a large difference with respect to the cold must;
addition to fermentation tank (the temperature of the must is generally in the range 10-25° C. at this stage).

This standard rehydration process is common industry practice. However it has a number of drawbacks:
It is tedious and time consuming in a busy period for winemakers;
Following all steps is complex and often not followed in practice;
The procedure is not convenient for large quantities of yeast (above 50 kg);
The rehydration vessels have to be cleaned thoroughly between successive rehydration processes to avoid cross-contamination between fermentation tanks when different yeast strains are used;
Considerable time is needed to complete the procedure;
Water is consumed;
When the procedure is not followed properly, the viability of the yeast is low and successful of implantation of the selected strain cannot be guaranteed.

One object of the present invention is to provide a method of, and apparatus for, delivering dry yeast (ADY or IDY) to a fermentation tank. A further object is to provide a yeast formulation incorporating additives for delivery to a fermentation tank.

BRIEF DESCRIPTION OF THE INVENTION

According to one aspect of the present invention there is provided a method of introducing yeast into a fruit juice to be fermented which method comprises feeding dry yeast into a flowing stream of the fruit juice, delivering the flowing stream of fruit juice with the yeast in it to a mixer, and feeding the fruit juice and yeast emerging from the mixer into a fermentation tank.

The term "yeast" when used herein means a yeast strain of the genii *Saccharomyces, Torulaspora, Metschnikowia, Pichia* or *Candida*, or a mixture thereof.

The term "viable yeast" when used herein means a yeast able to reproduce under favorable conditions while actively fermenting.

The term "inactivated yeast" when used herein means a yeast which has been disrupted and is no longer able to reproduce.

The mixer is preferably a high shear mixer.

The yeast can be in powder, vermicelli or pellet form.

The preferred form of the method comprises the steps of feeding the yeast from a hopper along a first pipe leading to a pipe junction, feeding fruit juice along a second pipe leading to said pipe junction, and feeding the mixed yeast and fruit juice along a pipe which leads away from said junction to the inlet of the high shear mixer.

The method can further comprise dispersing dry yeast nutrients in the dry viable yeast to form a dry mixture of nutrients and yeast, and introducing the dry mixture into the fruit juice. Such nutrients can be selected from inactivated yeasts, yeast autolysates, yeast cell hulls, yeast extracts, amino acids, peptides, proteins, sterols, ergosterol, thiamin, biotin, pantothenic acid, niacin, riboflavin, pyridoxine, minerals and inorganic nitrogen as ammonium salts and each can be used alone or in combination with other nutrients.

The combined introduction of these nutrients improves yeast viability after introduction into fruit juice and reduces the lag phase (initial phase before fermentation activity is noticeable). Therefore, it improves the implantation of the selected yeast into the fruit juice and ensures the requisite fermentation.

The method can include the preliminary steps of mixing yeast and the nutrients into the form of a cream before drying. Preferably the cream is filtered and the filter cake is extruded to form vermicelli or pellets before the drying step According to a further aspect of the present invention there is provided an installation which comprises a mixer having an inlet, a pipe leading from a pipe junction to said inlet, first and second pipes leading to said pipe junction and connected one to a source of dry yeast and the other to a source of fruit juice, a fermentation tank and a feed pipe leading from the outlet of said mixer to said fermentation tank.

The mixer is preferably a high shear mixer.

According to a still further aspect of the present invention there is provided a formulation which comprises dry viable yeasts mixed with one or more dry nutrients selected from inactivated yeasts, yeast autolysates, yeast hulls, yeast extracts, amino acids, peptides, proteins, sterols, ergosterol, thiamin, biotin, pantothenic acid, niacin, riboflavin, pyridoxine, minerals and inorganic nitrogen in the form of ammonium salts.

The nutrients can represent 10 to 70% by weight of the formulation.

The dry viable yeast can be mixed with inactivated yeast.

The dry viable yeast can constitute at least 20% of the dry weight of the yeast formulation. Preferably the dry viable yeast constitutes more than 30%, preferably more than 40%, preferably more than 50%, preferably more than 60% of the dry weight of the yeast formulation.

The yeast formulation is preferably produced by mixing the viable yeast and the nutrients in the form of a cream, filtering the cream and thereafter extruding and drying the filter cake.

The present invention also provides a method of producing wine which comprises feeding dry yeast into a flowing stream of grape must, delivering the flowing stream of grape must with the yeast dispersed in it to a mixer, feeding the grape must and yeast emerging from the mixer into a fermentation tank, and thereafter permitting fermentation to proceed in the fermentation tank.

BRIEF DESCRIPTION OF THE DRAWING

For a better understanding of the present invention, and to show how the same may be carried into effect, reference will now be made, by way of example, to the accompanying drawings in which.

DETAILED DESCRIPTION OF THE DRAWING

Figure 1:
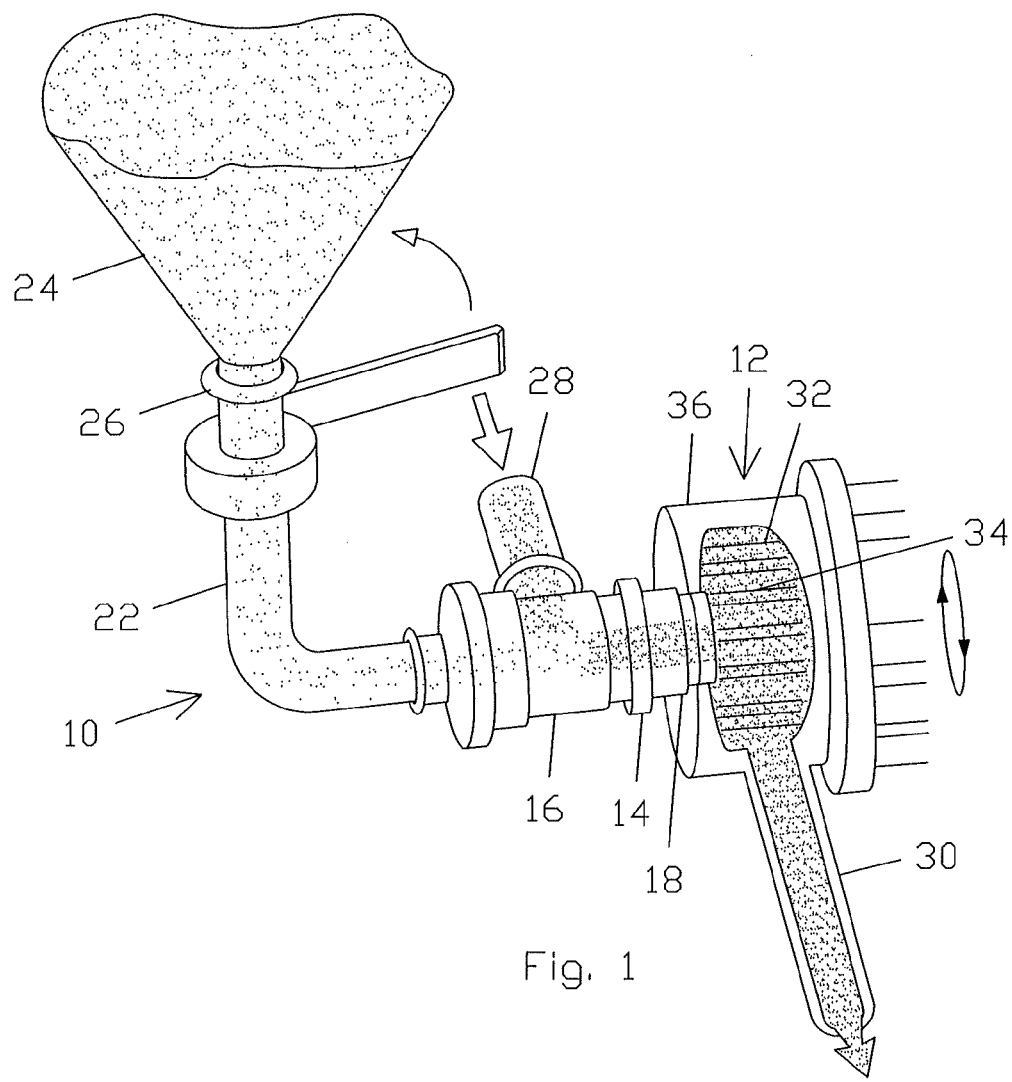
FIG. 1 diagrammatically illustrates an installation in accordance with the present invention.

The installation 10 illustrated in FIG. 1 comprises a high shear mixer 12. A pipe 14 leads from a pipe junction 16 to the inlet 18 of the mixer 12. A feed pipe 22 leads downwards from a hopper 24 and then horizontally to the pipe junction 16. A shut-off valve 26 is provided at the outlet of the hopper. The hopper can contain yeast pellets, yeast powder or yeast in the form of vermicellae. A mixture of yeasts can be provided and there can also be nutrients as will be described hereinafter.

A further pipe 28 leads from a source of fruit juice to the pipe junction 16. The fruit juice can be grape must if wine is to be made or apple or pear juice if cider is being made. A pipe 30 leads from the outlet of the high shear mixer 12 to a fermentation tank (not shown).

A suitable high shear mixer is that available from Silverson under the name "Flashmix". A Flashmix mixer comprises a cylindrical stator 32 within which there is a high speed rotor 34. The stator is within an outer casing 36. The rotor is configured to create a suction effect at the inlet 18. When the valve 26 is opened the suction effect draws yeast from the hopper 24 into the chamber bounded by the stator and in which the rotor turns. Centrifugal force drives the yeast and fruit juice outwardly towards the stator and milling takes place in the narrow gap between the stator and the rotor. The stator has perforations in it and the yeast is subjected to high hydraulic shear as it passes through these perforations to the outlet of the Flashmix. The motor which drives the rotor is not shown in the drawing.

For winemakers and the wine industry, the direct addition of yeast into grape must, that is the addition of yeast without a previous rehydration step, using the powder/liquid high shear mixer described above, brings a large number of substantial benefits when compared to the established industry practice (the rehydration process using hot water). These benefits include:

Time savings; the addition is almost instantaneous and does not require any follow up;

Labour savings: a standard rehydration process may take 2-4 hours in large wineries;

Efficiency: the success of the yeast implantation does not depend on worker skills or attention;

Simplicity: there is no need to have access to hot water;

Flexibility: the same equipment can be used for any type of dry yeast quantities, from a few hundred grams to hundreds of kilograms;

The method avoids cross-contamination between strains as the hopper and the rotor/stator mixer are designed for easy cleaning;

Water savings: no water is used for rehydration and for cleaning the bucket or other receptacle;

Energy savings: energy consumption is smaller than when using hot water;

Professionalism: the image of the winery is improved by the use of a modern equipment.

The present invention will now be explained in more detail with reference to the following winemaking examples. For comparison purposes, in all examples, the method of the present invention and a standard rehydration process were used.

EXAMPLES

Example 1 the test was carried out using active dry yeasts in vermicellae (strain Fermicru XL) and pellet (strain Anchor Vin13) forms.

The grape must used had the following characteristics:
Cultivar: Grenache blanc
Sugar: 230 g/L
pH: 3.37
Nitrogen (Free Available Nitrogen): 195 mg/L
Turbidity: 94 NTU
Free $SO_2$: 10 mg/L
Total $SO_2$: 45 mg/L
Pasteurized must with 1.7 10E3 wild microorganisms/ml
Temperature: 14° C.

Dry yeast was added at a dosage of 200 mg/l directly into the grape must according to the present invention. Specifically dry yeasts are placed in the hopper 24 and grape must is supplied through the pipe 28.

Dry yeast was added at a dosage of 200 mg/l after the following standard rehydration procedure: heating a solution of glucose at 50 g/l up to 37° C.; addition of dry yeast to this warm solution with continuous stirring; mixing; allowing to stand for 20 min; three successive dilutions with one volume of cold grape must; addition of the rehydrated yeast suspension into the fermentation tank containing the cold grape must.

After addition of yeast according to those two procedures, the fermentation tanks were held at 18 to 20° C. and the relevant parameters were monitored to follow the yeast population and the conditions of fermentation kinetics.

TABLE 1

Comparison of fermentation parameters and yeast viability during ethanol fermentation of a Grenache grape must inoculated with dry yeast added directly according to the present invention, and according to the standard rehydration procedure.

|  | Fermicru XL | | Anchor Vin 13 | |
|  | Mode of addition of dry yeast | | | |
|  | Direct addition according to present invention | Standard rehydration | Direct addition according to present invention | Standard rehydration |
| --- | --- | --- | --- | --- |
| Lag phase (h) | 30 | 24 | 35 | 29 |
| Living Yeast at 45 h (10E6 cfu/ml) | 42.4 | 43 | 13.4 | 12.2 |
| Residual sugars (in g/l) at 550 h | 21.1 | 22.8 | 4.8 | 8.1 |

There was no significant difference between the fermentation tank used with yeast added according to the present invention and the tank used with yeast added according to standard rehydration procedure. The figures set out in the tables are consequently not influenced by anything other than the mode of yeast addition.

Example 2

The test was carried out using active dry yeasts in vermicellae (strain Fermicru LS2) and pellet (strain Anchor Vin13) forms.

The grape must used had the following characteristics:
Cultivar: Syrah
Direct pressing
Sugar: 183 g/L
pH: 3.66
Nitrogen (Free Available Nitrogen): 105 mg/L
Turbidity: 30 NTU
Free $SO_2$: 12 mg/L
Total $SO_2$: 33 mg/L
Non Pasteurized must with 1.8 10E5 wild microorganisms/ml
Temperature: 16-17° C.

Dry yeast was added, at a dose of 200 mg/l directly into the grape must, according to the present invention. Specifically dry yeasts are placed in the hopper 24 and grape must is supplied through the pipe 28.

A standard rehydration procedure as follows was used: heating a blend of 25% grape must in water up to 37° C.; addition of dry yeast to this warm solution with continuous stirring, mixing; allowing to stand for 20 min; three successive dilutions with one volume of cold grape must; addition of the rehydrated yeast suspension into the fermentation tank containing the cold grape must.

After the addition of yeast at 200 mg/l according to those two procedures, the fermentation tanks were kept at 18° C. and relevant parameters were monitored to follow the yeast population and the conditions of fermentation kinetics.

TABLE 2

Comparison of fermentation parameters and yeast viability during ethanol fermentation of a Syrah grape must inoculated with dry yeast added directly according to the present invention, or according to standard rehydration procedure.

|  | Fermicru LS2 | | Anchor Vin 13 | |
|  | Mode of addition of dry yeast | | | |
|  | Direct addition according to present invention | Standard rehydration | Direct addition according to present invention | Standard rehydration |
| --- | --- | --- | --- | --- |
| % of living yeast 24 h after addition to grape must | 86 | 86 | 78 | 84 |
| Implantation control: % of selected yeast strain among total yeast population | 80 | 80 | 90 | 100 |
| Time to complete fermentation (days) | 9 | 9 | 9 | 8 |
| Residual sugars (g/l) at 240 h | 0.44 | 0.17 | 0.02 | 0.02 |

There was no significant difference between the fermentation tank used to add yeast according to the present invention and the tank used to add yeast according to the standard rehydration procedure. The figures set out above were consequently not influenced by anything other than the mode of yeast addition.

The different Syrah wines obtained were analysed at the end of fermentation.

TABLE 3

Composition of rosé wines obtained after complete ethanol fermentation of a Syrah must inoculated with dry yeast added directly according to the present invention, and according to standard rehydration procedure.

|  | Fermicru LS2 | | Anchor Vin 13 | |
|  | Mode of addition of dry yeast | | | |
|  | Direct addition according to present invention | Standard rehydration | Direct addition according to present invention | Standard rehydration |
| --- | --- | --- | --- | --- |
| Ethanol content (%) | 11.65 | 11.6 | 11.6 | 11.55 |
| Total acidity (in g/l sulfuric acid) | 3.9 | 4.05 | 3.75 | 3.85 |
| Volatile acidity (in g/l acetic acid) | 0.11 | 0.15 | <0.06 | <0.06 |
| Isoamyl acetate (mg/l) | 8.64 | 7.08 | 7.56 | 6.63 |
| hexyl acetate (mg/l) | 0.76 | 0.63 | 0.65 | 0.61 |
| ethyl hexanoate (mg/l) | 1.79 | 1.53 | 1.51 | 1.44 |
| ethyl octanoate (mg/l) | 1.31 | 1.07 | 1.40 | 1.28 |

The completion of ethanol fermentation in all tanks was reflected in similar ethanol content in all wines.

Surprisingly, the wines obtained using the winemaking process including the introduction of dry yeast in accordance with the present invention have been found to be of higher quality than control wines made from the same grape must but after addition of rehydrated yeasts. This increased quality was noticeable as the wines obtained had a higher ester content (more aroma) and a lower acetic acid content (lower volatile acidity).

Example 3

A test was carried out using two different active dry yeasts preparations of the same strain (commercial yeast Fermicru AR2) in vermicellae forms.

Standard commercial yeast Fermicru AR2, produced according to standard yeast manufacturing practices.
A Yeast Product AR2 produced as described below:
Strain AR2 is grown as fresh cream yeast, according to standard yeast manufacturing practices
The cream yeast is blended with dry inactivated yeast in a ratio of viable yeast/inactivated yeast 70/30 (dry weight basis)
The blend obtained is then vacuum filtered, extruded and dried according to standard yeast manufacturing practice.
This Yeast Product AR2 contains 70% viable dry yeasts on a dry weight basis
The characteristics of both yeasts used for Example 3 are listed in Table 4

TABLE 4

Characteristics of standard commercial Fermicru AR2 and Yeast Product AR2

|  | commercial Fermicru AR2 | Yeast Product AR2 |
| --- | --- | --- |
| Total viable yeast count (CFU/g) | 4.00E+10 | 2.49E+10 |
| Active yeast (% dry matter) | >99 | 70 |
| Inactive yeast (% dry matter) | <1 | 30 |
| Dry matter % | 94.00 | 92.24 |

The grape must used had the following characteristics:
Cultivar: Chardonnay
Sugar: 210 g/L
pH: 3.66
Nitrogen (Free Available Nitrogen): 177 mg/L
Turbidity: 40 NTU
Free $SO_2$: 5 mg/L
Total $SO_2$: 18 mg/L
Temperature: 19.5° C.

The standard commercial yeast Fermicru AR2 was added at a dosage of 200 mg per liter of grape must directly into the grape must according to the present invention. Specifically dry yeasts are placed in the hopper 24 and grape must is supplied through the pipe 28.

The Yeast product AR2 was added at a dosage of 300 mg per liter of grape must directly into the grape must according to the present invention. Specifically dry yeasts are placed in the hopper 24 and grape must is supplied through the pipe 28. As this yeast product contains 70% of viable yeasts, the total population added per liter of must was similar to Fermicru AR2.

After direct addition of both yeasts to the Chardonnay must according to the method of present invention, both fermentation tanks were held at 18° C. and the relevant parameters were monitored during the initial 80 hours of fermentation, to follow the yeast population and the conditions of fermentation kinetics. The fermentation kinetic curves, expressed as the instant production of CO2 (dCO2/dt, expressed in g/l/h) as a function of time, clearly show (FIG. 2) a better start of the fermentation with the Yeast Product AR2 than with the commercial yeast Fermicru AR2.

Figure 2:
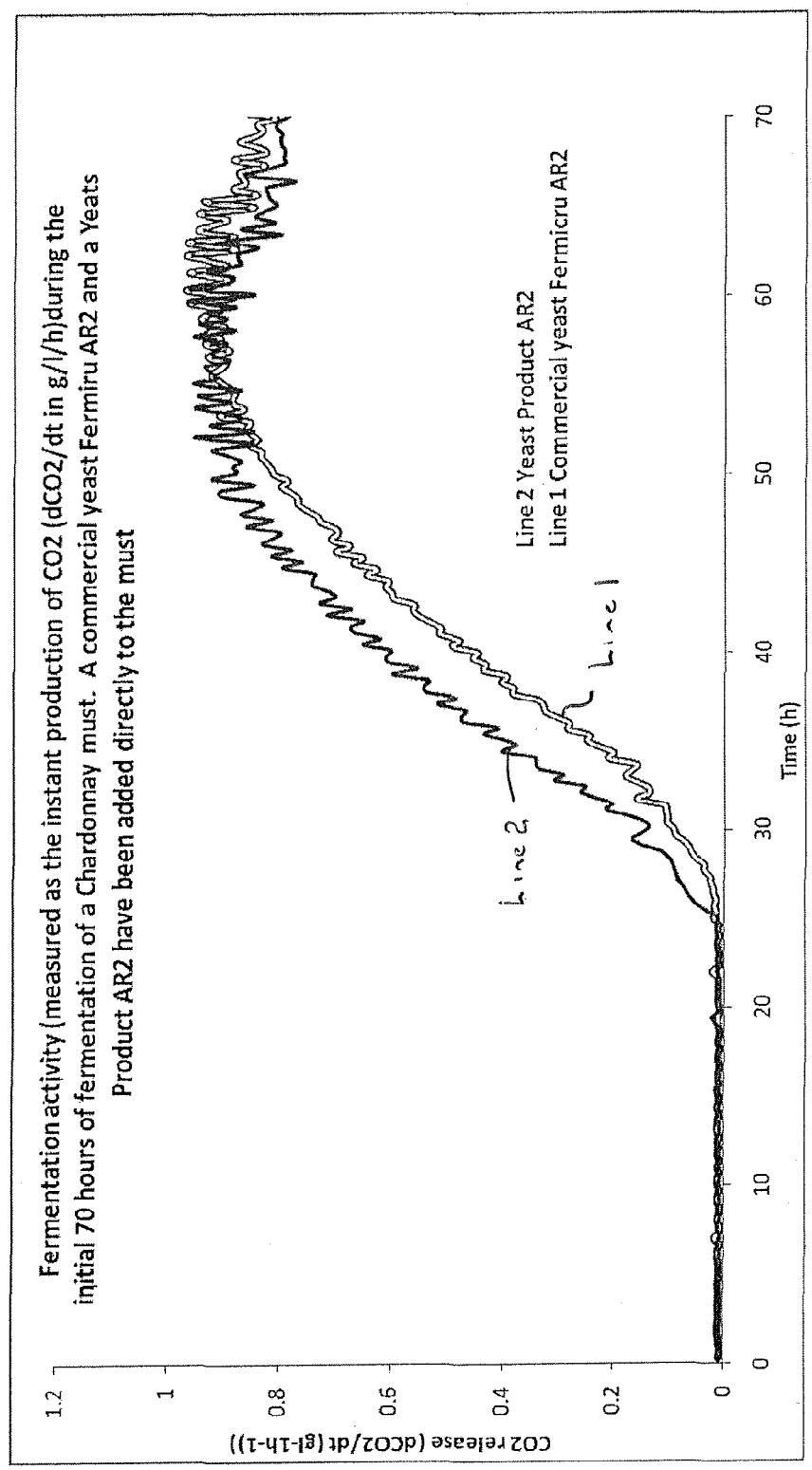
FIG. 2 illustrates the influence of the present invention on the performance of yeast in fermentation.

In FIG. 2 the line designated 1 shows the rate of carbon dioxide release with time when the commercial yeast Fermicru AR2 is fed into the grape must in accordance with the method of the present invention. Line 2 shows the rate of carbon dioxide production with time when the Yeast Product AR2 is fed into the grape must in accordance with the method of the present invention.

This faster start of fermentation is also reflected in other fermentation and yeast viability parameters, as shown in Table 5. The total yeast population per ml of fermenting must was very significantly larger when the Yeast Product AR2 was used than the commercial yeast Fermicru AR2.

TABLE 5

Comparison of fermentation parameters and yeast viability during ethanol fermentation of a Chardonnay grape must inoculated with a commercial yeast (Fermicru AR2) or with an experimental Yeast product (AR2) added directly to the must according to the present invention.

|  | Commercial yeast Fermicru AR2 | Yeast Product AR2 |
| --- | --- | --- |
| Lag phase (hours) | 28 | 24 |
| % of living yeast 24 h after direct addition to grape must | 57 | 63 |
| Total yeast population at 18 hours (in CFU/ml) | 9.2 | 14 |
| Total yeast population at 50 hours (in CFU/ml) | 42 | 56 |
| Total yeast population at 74 hours (in CFU/ml) | 65.2 | 74 |
| Residual sugars (g/l) at 80 h | 61.4 | 55.1 |

The invention claimed is:

1. A method of introducing yeast into a fruit juice to be fermented, the method comprises feeding dry yeast into an uninterrupted flowing stream of the fruit juice such that the dry yeast comes into direct contact with the fruit juice without a previous rehydration step of the dry yeast, delivering the flowing stream of fruit juice with the yeast in it to a mixer, and feeding the fruit juice and yeast emerging from the mixer into a fermentation tank.

2. The method of claim 1, wherein the mixer is a high shear mixer.

3. The method of claim 1, wherein the yeast is in powder, vermicelli or pellet form.

4. The method of claim comprising the steps of feeding the yeast from a hopper along a first pipe leading to a pipe junction, feeding the fruit juice along a second pipe leading to said pipe junction, and feeding the mixed yeast and fruit juice along a pipe which leads away from said junction to an inlet of the mixer.

5. The method of claim 1, comprising dispersing dry yeast nutrients in dry viable yeast to form a dry mixture of nutrients and viable yeast, and introducing the dry mixture into the flowing stream of fruit juice.

6. The method of claim 5, wherein said nutrients are selected from inactivated yeasts, yeast autolysates, yeast cell hulls, yeast extracts, amino acid, peptides, proteins, sterols, ergosterol, thiamin, biotin, paraothenic acid, niacin, riboflavin, pyridoxine, minerals and inorganic nitrogen in the form of ammonium salts.

7. The method of claim 5, comprising mixing viable yeast and the nutrients into the form of a cream, filtering the cream and thereafter drying a filter cake.

8. The method of claim 7, wherein the filter cake is extruded to form vermicelli or pellets before the drying step.

9. An installation which comprises a mixer having an inlet, a pipe leading from a pipe junction to said inlet, first and second pipes leading to said pipe junction, the first pipe connected to a source of dry yeast and the second pipe connected to a source of fruit juice such that the dry yeast comes into direct contact with the fruit juice without a previous rehydration step of the yeast, a fermentation tank and a feed pipe leading from an outlet of said mixer to said fermentation tank.

10. The installation of claim 9, wherein the mixer is a high shear mixer.

11. A method of producing wine which comprises introducing dry yeast into an uninterrupted flowing stream of grape must such that the dry yeast comes into direct contact with the grape must without a previous rehydration step of the dry yeast, delivering the flowing stream of grape must with yeast in it to a mixer, and feeding the grape must and yeast emerging from the mixer into a fermentation tank; and thereafter permitting fermentation to proceed in the fermentation tank.

* * * * *